Feb. 5, 1929. E. S. JOHNSON Re. 17,204

AUTOMOBILE SUPPLY TANK AND HOLDER

3 Sheets-Sheet 1

Original Filed Oct. 15, 1924

Witness

Inventor

Ernest S. Johnson by Bair & Freeman Attorneys

Feb. 5, 1929. E. S. JOHNSON Re. 17,204

AUTOMOBILE SUPPLY TANK AND HOLDER

3 Sheets-Sheet 2

Original Filed Oct. 15, 1924

Witness
R. H. Rushey

Inventor
Ernest S. Johnson
by Bair & Freeman Attorneys

Feb. 5, 1929. E. S. JOHNSON Re. 17,204
AUTOMOBILE SUPPLY TANK AND HOLDER
Original Filed Oct. 15, 1924 3 Sheets-Sheet 3
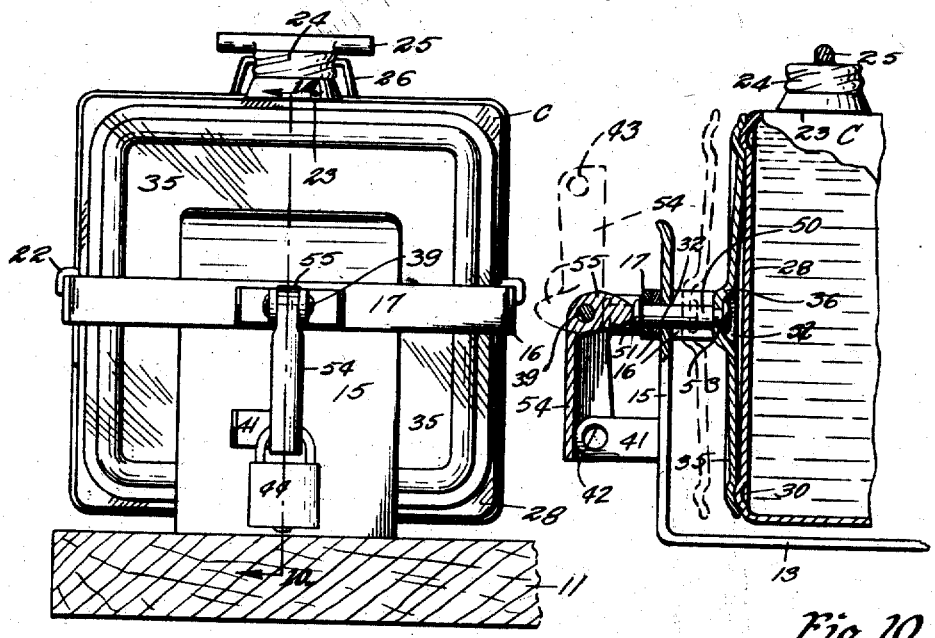
Fig. 9.
Fig. 10.
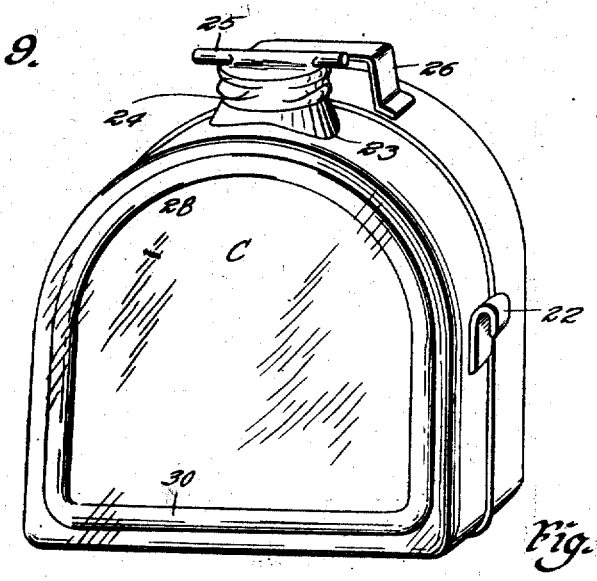
Fig. 11.
Witness
G. A. Kuaker
Inventor
Ernest S. Johnson
by Bair & Freeman Attorneys Reissued Feb. 5, 1929. Re. 17,204

UNITED STATES PATENT OFFICE.

ERNEST S. JOHNSON, OF WEBSTER CITY, IOWA.

AUTOMOBILE SUPPLY TANK AND HOLDER.

Original No. 1,613,111, dated January 4, 1927, Serial No. 743,705, filed October 15, 1924. Application for reissue filed April 8, 1927. Serial No. 182,142.

The object of my invention is to provide supply tanks adapted to be supported upon a running board of an automobile, arranged to coact with each other, whereby a single locking means may be employed for holding all of the tanks or canteens in locked position.

Still a further object is to provide a supporting rack or frame fixed to a running board of an automobile for retaining articles to be carried, the frame having parts adapted to coact with the two ends of the articles, whereby the same may be locked against removal from the frame and are retained therein.

Still a further object is to provide coacting grooves and ribs on the adjacent surfaces of the several canteens whereby the ribs may be received in the grooves for locking all of the canteens against removal when brought in position to coact with the supporting rack or frame.

Still a further object is to provide a movable plate or disk member on one end of the frame arranged to coact with one of the end canteens for locking all of the canteens together, the movable disk member being controlled by a movable handle which may be padlocked to a fixed portion of the supporting frame.

Still a further object is to provide the fastenings of the rack or frame to the automobile running board in such a manner that when the articles are within the frame it will be impossible to remove the fastenings without first removing the articles.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 9 shows an end view of a slightly modified form in which my invention may be embodied.

Figure 10 is a vertical, sectional view taken on the line 10—10 of Figure 9; and Figure 11 is a perspective view of another form of canteen.

Figure 1:
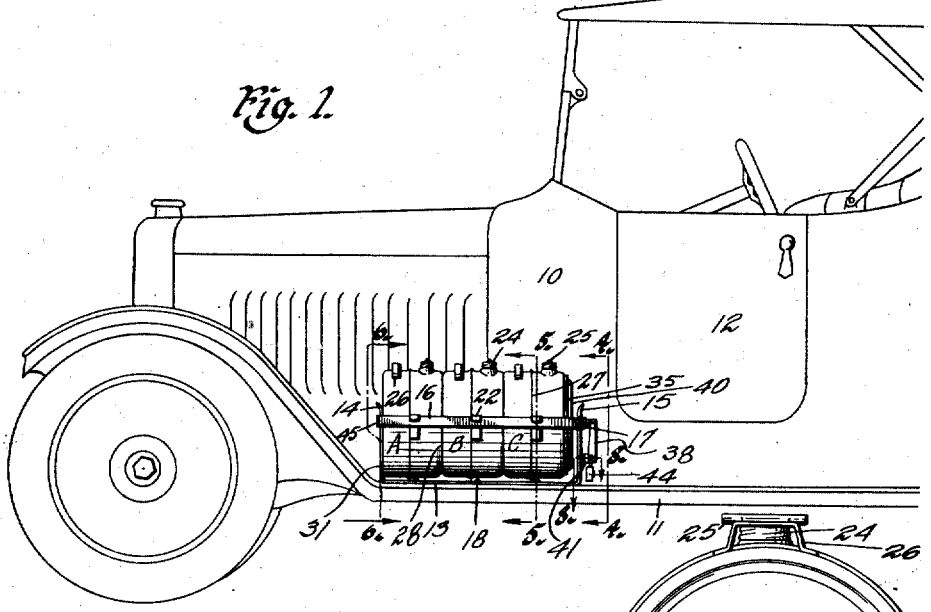
Figure 1 is a side elevation of a portion of an automobile with my improved canteen supply and frame therefor shown thereon.

In the accompanying drawings, I have used the reference numeral 10 to indicate generally an automobile, which is provided with a running board 11 and a door 12 for gaining access into the automobile itself.

My improved device is positioned for instance upon the running board 11 preferably just forward of the front door 12, although the position on the running board may be varied as desired. The supporting frame for securing my canteens includes a flat bottom plate 13 having its ends upturned so as to provide end walls 14 and 15.

A horizontally disposed rectangular frame 16 is secured to the end walls 14 and 15 of the supporting frame near the upper ends thereof in any suitable manner such as by spot welding or the like.

The frame 16 on its end adjacent the end wall 15 is provided with a reinforcing bar 17, the purpose of which will be hereinafter more fully set forth.

Figure 6:
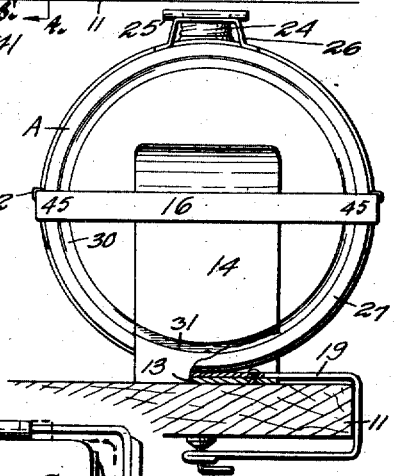
Figure 6 is a sectional view taken on the line 6—6 of Figure 1 with a slightly modified form of fastening for securing the frame to the running board.

The bottom plate 13 may be secured to the running board 11 by suitable screws 18 or may be fastened thereto by a U-shaped clamp 19 having a locking screw 20 thereon arranged to extend around the outer edge of the running board and to be locked against the underside thereof, as clearly shown in Figure 6 of the drawings.

When the fastening, as shown in Figure 6 of the drawings, is used, it is possible to remove the entire device by simply loosening the locking screw 20.

Where the screws 18 are used, there is provided a structure which is more permanently secured to the running board and which is not accessible except upon removal of the canteens or articles retained within the frame 16.

The screws 18 extend through openings 21, which may be formed at suitable intervals in the bottom plate 13 of the frame.

Received in the rectangular frame 16 are the canteens A, B and C, which are used for containing any liquid such as water, oil and gasoline. The canteens A, B and C may be colored differently so as to clearly indicate the contents thereof; for example, the canteen to contain gasoline may be painted red; the canteen to contain water may be painted gray; and the canteen to contain oil may be painted green.

The canteens, A, B and C may be circular in vertical, transverse cross section, or may be substantially rectangular as shown in Figure 9, or may have vertical side walls, rounded tops and flat bottoms, as illustrated in Figure 11, or may have any contour or shape adaptable for the purpose. Articles such as canteens or other containers are retained within the frame 16 as will hereinafter be more fully set forth.

Figure 5:
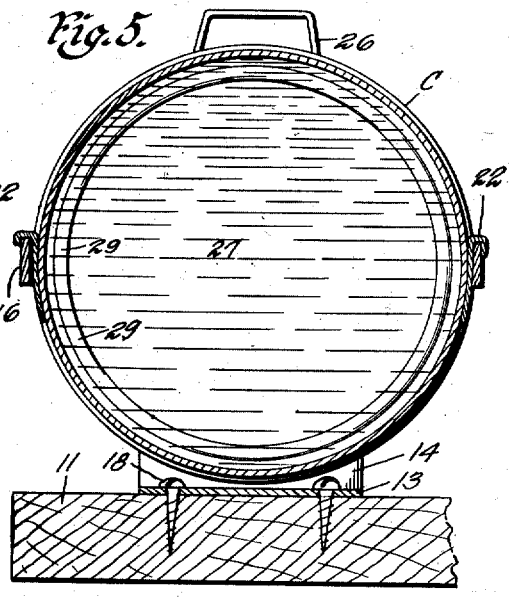
Figure 5 is a sectional view taken on the line 5—5 of Figure 1.

On each canteen are fixed supporting hooks 22, which engage the sides of the rectangular frame 16, as illustrated in Figure 5 for supporting each of the canteens just above the bottom plate 13. The supporting hooks are used for canteens or other light containers although, heavy articles such as trunks may be placed upon the bottom plate 13 and within the frame 16.

By providing the supporting hooks 22 and locking the canteens together, as will be hereinafter more fully described. I am able to hold the canteens against rattling and undue vibration, thereby preventing their wearing out by engagement with parts of the frame or with each other.

Each of the canteens A, B and C is provided with a short neck 23, which is screw threaded for receiving a closure cap 24. The cap 24 may have fixed to it a short bar or handle 25 whereby it may be easily gripped for removing the cap 24 from the neck 23. Each of the canteens A, B and C is also provided with a handle 26.

Each canteen is formed with two end walls 27 and 28. The wall 27 is formed with an annular groove 29 and the wall 28 is formed with an annular outpressed rib 30.

Figure 7:
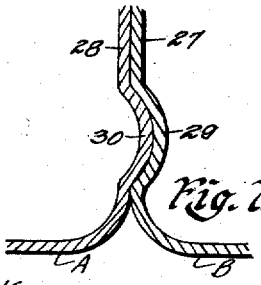
Figure 7 is a detail, sectional view through portions of two adjacent canteens showing the coacting rib and groove on the adjacent surfaces of the canteens.
Figure 3:
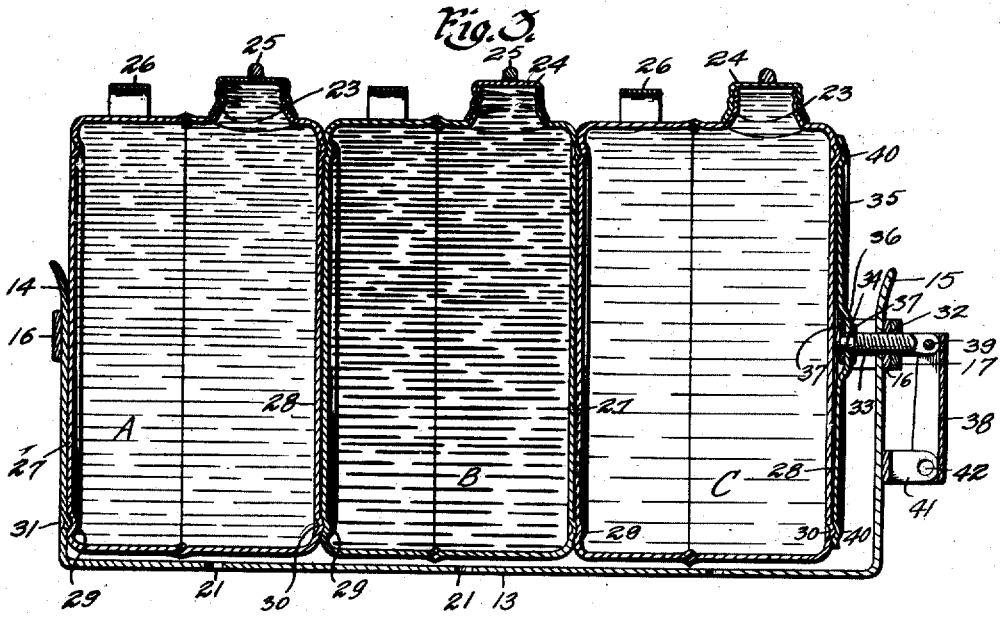
Figure 3 is a central, vertical, sectional view taken on line 3—3 of Figure 2 showing the coacting grooves and ribs on the frame and the canteens themselves.
Figure 4:
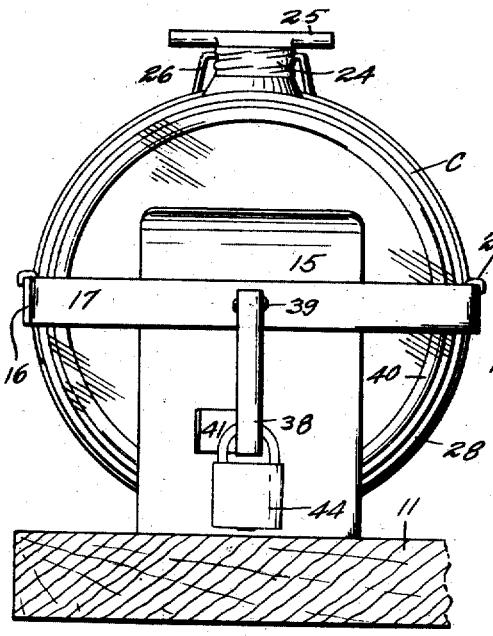
Figure 4 is a sectional view taken on line 4—4 of Figure 1 showing the locking handle on the frame.

The rib 30 on the wall 28 is designed to coact with the groove 29 in the wall 27 of the adjacent canteen, as clearly shown in Figures 3 and 7 of the drawings.

The end wall 14 is formed with a rib 31, which coacts with a portion of the groove 29 formed in the wall 27 of the canteen placed adjacent the end wall 14.

Formed in the reinforcing bar 17, the frame 16, and the end wall 15, is a screw-threaded opening 32, which has received therein a screw-threaded rod 33.

The rod 33 has its inner end contracted as at 34.

Rotatably mounted upon the contracted end 34 of the rod 33 is a disc or plate 35 or its equivalent, designed to fit against the end wall of one of the canteens or article placed within the frace 16.

The disc or plate 35 is formed with an outpressed part 36 for permitting washers 37 to be positioned on each side thereof and around the contracted end 34, and the free end of the contracted portion 34 may be flattened for retaining the disc 35 and washers 37 thereon. The disc 35 may be free to rotate relative to the rod 33.

The out-pressed portion provides a sufficient space for receiving one of the washers 37 and the flattened end of the contracted portion 34 without striking against the wall of the adjacent canteen.

Secured to the outer end of the screw-threaded rod 33 is a handle 38 mounted upon the pivot pin 39.

The handle 38 is capable of swinging movement upon the pivot pin 39 and is substantially channel-shaped in cross section.

By engaging the handle 38, I am able to rotate the rod 33 in the screw-threaded opening 32.

The reinforcing bar 17 adds to the length of the opening 32 thereby affording a sufficient screw-threaded support and bearing for the rod 33.

The disc or plate 35 near its periphery is formed with a groove 40, which is substantially like the groove 29 in the wall 27 of the canteens, and is designed to coact with the rib 30 on the wall 28 of the canteen adjacent thereto, as clearly shown in Figure 3 of the drawings.

By rotating the handle 38, it will cause the disc 35 to be moved against the wall 28 of the adjacent canteen thereby causing all of the canteens to be locked together and with the frame itself for preventing the removal of any of them without first loosening the disc 35. The canteens or other articles are thus held within the frame 16.

A lug or bracket 41, secured to the end wall 15 in any suitable manner, has an opening 42 therein. The handle 38 may be swung upon its pivot for bringing it to position where its two sides will receive the lug 41 therebetween.

Figure 8:
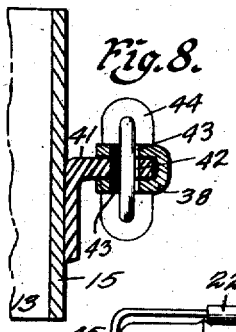
Figure 8 is a detail, sectional view taken on the line 8—8 of Figure 1, showing the padlock in position for connecting the handle and the frame together.

The handle 38 is formed in each of its sides with openings 43 (Figure 8), which register with the opening 42 for permitting a padlock 44 to be extended therethrough for preventing the unauthorized removal of any of the articles from the frame.

There is a sufficient amount of play or movement allowed for the disc 35, to permit the canteens to be disengaged from each other and thus permit them to be withdrawn from the frame.

From the foregoing, it will be seen that the canteens themselves coact with each other and that the two end canteens coact with the frame on one end and with a disc or plate mounted on the frame on the other end.

Any suitable number of canteens may be employed and the locking means for holding them together will at all times be the same.

It is only necessary that the canteens be inserted in such position that the end walls adjacent the end wall frame 14 and the disc 35 will coact with the grooves and ribs or equivalent coacting engaging means in or on the walls of the canteens.

It may be here mentioned that the rectangular frame 16 adjacent the end wall 14 is preferably slightly inclined so that the end canteen A is not only engaged by the end wall 14 of the frame but also by the frame 16 at points 45.

The canteens can be tightly locked together so as to prevent any possible vibration or movement thereof, thus giving me a structure that will not make any noise or rattle and will not be destroyed by parts rubbing constantly against each other.

Figure 2:
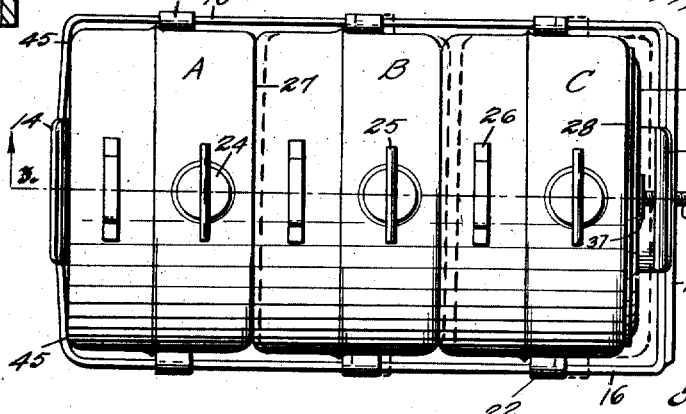
Figure 2 is a top, plan view of the supply canteens and frame.

For example, if it is desired to remove the canteen B without removing either of the other canteens, all that is necessary is to loosen the disc 35 and then shift the canteen C as far as possible, which will permit the canteen B to be slid toward it a slight distance, thus clearing the grooves and ribs of the canteen B from the canteens A and C and permitting its removal from the supporting frame, as shown in dotted lines in Figure 2 of the drawings.

In Figures 9 and 10, I have shown a different form of fastening device, to illustrate an equivalent form to that heretofore described and as suggestive of various fasteners that might be used.

Slidably extended through the members 15, 16 and 17 is a rod 50 having at its ends, heads or the like 51. Adjacent to the inner head 51, the rod 50 has a reduced portion 52 on which the disc or plate 35 is mounted. A handle 54 generally similar in construction to the handle 38, is provided with a cam 55 to coact with the rod 50 for locking the canteens against removal.

The locking device that retains the articles within the frame 16 is mounted upon one end thereof so that the tightening of the articles within the frame is caused by an endwise adjustment.

I have found that my device in actual practice has proven very efficient for supporting canteens with liquid therein and that the frame and locking structure wherein the canteens coact with each other and with the frame is important in giving me a structure that will not be subjected to becoming loose and rattling.

Another advantage of my structure is the locking structure whereby a padlock may be used for locking all the canteens or other articles in the frame, where they will be held against removal. Where the screws 18 or equivalent fastening means are employed, they are inaccessible until after the canteens or the like are taken out, and an additional security against theft is thus provided.

I have thus provided a supply tank and holder structure including a fixed frame or the like and a plurality of canteens of very simple and inexpensive construction having a number of important advantages.

The frame, if secured to the running board under the article held thereby, has its fastening means protected against being tampered with. The frame has parts whereby the articles may be easily locked within the frame and held against removal.

The canteens and the frame may be made of a variety of materials and in various shapes.

Changes may be made in the details of structure and arrangement of parts, without avoiding the real invention involved, and it is my purpose to cover by my claims any such changes or modifications as may be within the real scope of my invention.

I claim as my invention:

1. A supply canteen structure including canteens, a horizontally disposed supporting frame, lugs on said canteens for supporting them on the frame whereby the canteens are capable of sliding movement therealong, means on the adjacent walls of the canteens for coacting with each other for preventing their removal from the frame when placed against each other.

2. A supply canteen structure including canteens, a horizontally disposed supporting frame encircling the canteens, lugs on said canteens for supporting them on the frame and positioning them vertically thereon, said lugs being capable of longitudinally sliding movement on said frame, means on the adjacent walls of the canteens for coacting with each other for preventing their removal from the frame when placed against each other, and means on the frame for coacting with the canteens.

3. A supply canteen structure including a supporting frame, canteens, said frame encircling said canteens, means on said canteens for supporting them on said frame and movable means on said frame for forcing all of the canteens towards each other, said canteens having coacting parts for preventing their withdrawal from the frame after said movable means has been operated.

4. A supply canteen structure including a supporting frame rectangular in form, canteens, means on said canteens for supporting them on said frame whereby they are longitudinally movable therealong, and movable means on said frame for forcing all of the canteens towards each other and towards one end of the frame.

5. A supply canteen structure including a supporting frame, canteens, said frame encircling said canteens, means on said canteens for supporting them on said frame and movable means on said frame for forcing all of the canteens towards each other and towards one end of the frame, said canteens having coacting parts for preventing their withdrawal from the frame after said movable means has been operated.

6. A supply canteen structure including a base, a supporting frame on said base, canteens, means on said canteens for supporting them on and within the outline of said frame and movable means for forcing all of said canteens towards each other and towards one end of said frame, fixed means for engaging an end canteen on said frame, and said canteens having coacting parts for preventing their withdrawal from the frame after said movable means has been operated.

7. A supply canteen structure including a rectangular supporting frame, canteens supported within the rectangular supporting frame, grooves and ribs in the opposite sides of the canteens for coacting with the grooves and ribs in the adjacent canteens and means on the frame manually operated for forcing the canteens into position where the grooves and ribs will coact for preventing the withdrawal of any canteen.

8. A supply canteen structure including a rectangular supporting frame, canteens supported on and within the outline of said frame having grooves and ribs in their opposite sides for coacting with the grooves and ribs in the adjacent canteens, means on the frame to coact with one of the canteens and a plate having parts thereon to coact with the canteen adjacent thereto whereby movement of the plate toward the canteens will retain them in locked position within said frame.

Des Moines, Iowa, April 5, 1927.

ERNEST S. JOHNSON.